US008867521B2

(12) United States Patent
Hakola et al.

(10) Patent No.: US 8,867,521 B2
(45) Date of Patent: Oct. 21, 2014

(54) APPARATUS AND METHOD FOR COMMUNICATION

(75) Inventors: Sami-Jukka Hakola, Kempele (FI); Timo Koskela, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 315 days.

(21) Appl. No.: 13/218,634

(22) Filed: Aug. 26, 2011

(65) Prior Publication Data
US 2013/0051383 A1 Feb. 28, 2013

(51) Int. Cl.
H04J 3/06 (2006.01)
H04B 1/713 (2011.01)

(52) U.S. Cl.
CPC .................................... H04B 1/713 (2013.01)
USPC ............................ 370/350; 370/310; 370/345

(58) Field of Classification Search
None
See application file for complete search history.

(56) References Cited

U.S. PATENT DOCUMENTS

| 2001/0001616 | A1* | 5/2001 | Rakib et al. ................... 375/259 |
| 2004/0240525 | A1* | 12/2004 | Karabinis et al. ............. 375/132 |
| 2006/0148482 | A1* | 7/2006 | Mangold ....................... 455/450 |
| 2007/0064770 | A1* | 3/2007 | Horiguchi ..................... 375/133 |
| 2008/0095110 | A1* | 4/2008 | Montojo et al. .............. 370/330 |
| 2008/0145057 | A1* | 6/2008 | Lee et al. ...................... 398/103 |
| 2009/0175232 | A1* | 7/2009 | Kolding ........................ 370/329 |
| 2010/0037114 | A1* | 2/2010 | Huang et al. ................. 714/749 |
| 2010/0098020 | A1* | 4/2010 | Kim et al. ..................... 370/330 |
| 2011/0032894 | A1* | 2/2011 | Miki et al. .................... 370/329 |
| 2011/0053498 | A1* | 3/2011 | Nogueira-Nine .............. 455/15 |

OTHER PUBLICATIONS

Anritsu, Testing the future, LTE Resource Guide, 2009.*

* cited by examiner

Primary Examiner — Hassan Phillips
Assistant Examiner — Gautam Sharma
(74) Attorney, Agent, or Firm — Stanton IP Law

(57) ABSTRACT

Apparatus and method for communication are provided. The solution includes controlling the communication of a transceiver on shared data channels using a data channel slot including a sensing period and a data period and controlling a transceiver to communicate on common and dedicated control channels on a shared spectrum using control channel slots, each control channel slot including a downlink part and an uplink part, wherein the uplink part occurs at the same time as the sensing period of a data channel slot.

21 Claims, 7 Drawing Sheets

APPARATUS AND METHOD FOR COMMUNICATION

FIELD

The exemplary and non-limiting embodiments of the invention relate generally to wireless communication networks. Embodiments of the invention relate especially to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. The increased spectrum requirements due the increased data traffic drives operators seek offloading solutions for their traffic via local nodes providing local access to the Internet to prevent congesting own core network. A wide variety of diverse size of cells and connected devices are proposed in addition to traditional macro and microcells. However, the available frequency resources are limited and need for efficient use of the resources is essential.

Traditional solutions to improve spectrum efficiency cannot support the predicted data traffic in the future. Thus, operators, network and device manufacturers and other players in the field are considering the utilization of license-exempt (LE) or unlicensed frequency bands along with costly licensed spectrum. The LE spectrum can also be called as shared spectrum. Shared spectrum is only lightly regulated; users do not need licenses to exploit them. From the cellular traffic point of view, an interesting shared spectrum band opportunity is Industrial, Scientific and Medical (ISM) bands. The ISM bands are widely used for WLAN and Bluetooth® communication, for example. The ISM bands allow both standardized systems and proprietary solutions to be deployed onto spectrum as far as regulations are followed. The regulations define maximum transmission powers and certain rules for systems for the operation on the band.

Currently it is challenging to for many cellular systems such as the third and fourth generation systems long term evolution (LTE, known also as E-UTRA) and long term evolution advanced (LTE-A) to utilise ISM bands for example due to required continuous and synchronous resource allocation for control channels both in downlink and uplink transmission directions.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus in a communication system, comprising: at least one processor; and at least one memory including computer program code, the at least one memory and the computer program code configured to, with the at least one processor, cause the apparatus at least to perform: control the communication of a transceiver on shared data channels using a data channel slot comprising a sensing period and a data period; control a transceiver to communicate on common and dedicated control channels on a shared spectrum using control channel slots, each control channel slot comprising a downlink part and an uplink part, wherein the uplink part occurs at the same time as the sensing period of a data channel slot.

According to another aspect of the present invention, there is provided a method in a communication system, comprising: controlling the communication of a transceiver on shared data channels using a data channel slot comprising a sensing period and a data period; controlling a transceiver to communicate on common and dedicated control channels on a shared spectrum using control channel slots, each control channel slot comprising a downlink part and an uplink part, wherein the uplink part occurs at the same time as the sensing period of a data channel slot.

According to an aspect of the present invention, there is provided a computer program product embodied on a distribution medium readable by a computer and comprising program instructions which, when loaded into an apparatus, execute a computer process comprising: controlling the communication of a transceiver on shared data channels using a data channel slot comprising a sensing period and a data period; controlling a transceiver to communicate on common and dedicated control channels on a shared spectrum using control channel slots, each control channel slot comprising a downlink part and an uplink part, wherein the uplink part occurs at the same time as the sensing period of a data channel slot.

LIST OF DRAWINGS

Embodiments of the present invention are described below, by way of example only, with reference to the accompanying drawings, in which FIG. 1 illustrates an example of a communication environment;

DESCRIPTION OF SOME EMBODIMENTS

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers.

Figure 1:
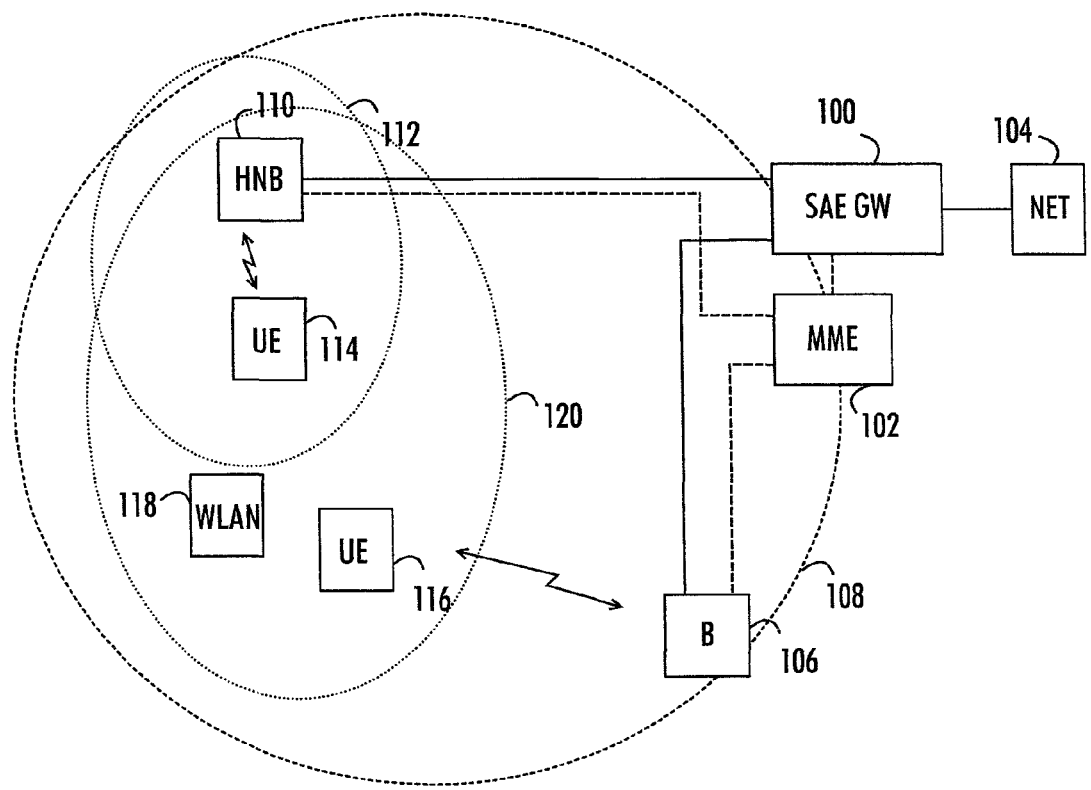

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a SAE Gateway 100 and an MME 102. The SAE Gateway 100 provides a connection to Internet 104. FIG. 1 shows an eNodeB 106 serving a macro cell 108. In addition, a local area base stations or Home NodeB HNB 110 with a corresponding coverage area 112 is shown. In this example, the Home NodeB 110 and the eNodeB 106 are connected to the SAE Gateway 100 and the MME 102.

In the example of FIG. 1, user equipment UE 114 is camped on the HNB 110. The UE 116 is camped on the eNodeB 106. Furthermore, a wireless local area (WLAN) base station 118 is transmitting with a coverage area 120.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

User equipment UE refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In an embodiment, at least some of the above connections between NodeB's and UEs utilise an unlicensed or shared spectrum which may be the same as the spectrum used by the WLAN base station 118 or by some other apparatus utilizing ISM spectrum.

The regulations applying to the usage of shared spectrum require different systems to use the available resources in a fair manner without causing excessive interference to other systems using the same resources.

In an embodiment, Listen-Before-Talk (LBT) or channel contention between the devices communicating on the shared spectrum is used to reduce interference. LBT or channel contention may require a device to listen, monitor or measure the usage of a channel for a given time before making the decision whether to transmit on the channel or not. In an embodiment, the device may monitor energy level on a channel and if the level is above a given threshold it may determine that the channel is in use by another device. If the channel or spectrum is used by another device the transmitter is configured to abstain from transmitting or select a different channel.

As most cellular systems require that control channel transmissions are continuous and synchronous the restricted use of resources on shared spectrum is challenging as the resource allocation for control channels both in downlink and uplink transmission directions is problematic. In addition, if LBT type of channel access is utilized, the resource allocation for synchronization signals, critical control channel signalling like HARQ (Hybrid automatic repeat request) feedback is challenging as there is no certainty that resources for the required HARQ feedback for the earlier data transmission can be obtained.

In LTE based systems, dedicated and common control channels include Physical Broadcast Channel PBCH, Physical Control Format Indicator Channel PCFICH, Physical Downlink Control Channel PDCCH, Physical HARQ Indicator Channel PHICH, Physical Uplink Shared Channel PUSCH and synchronization signals.

As one skilled in the art is well aware embodiments of the invention are not limited to LTE based systems. The above channels and numerical values below are mentioned as a non-limiting example only.

In an embodiment, it is proposed to transmit dedicated and common control channels using frequency hopping. In LTE based systems, synchronization signals are currently transmitted among the symbols of Physical Downlink Shared Channel PDSCH. In an embodiment of the invention, the synchronization signals are transmitted in the control channel region utilizing frequency hopping. The regulations on ISM bands require maximum continuous frequency bandwidth for the hopping system to be less than 1 MHz and that the hopping system should hop pseudo-randomly between at least 15 non-overlapping frequency channels. As synchronization signals and PBCH on downlink require a 1.08 MHz bandwidth (6 Physical Resource Blocks PRB), the present LTE method of mapping control channels onto radio resources cannot be applied.

In an embodiment, it's proposed that control channel transmission on downlink and uplink utilize a pair-wise hopping of frequency pieces. In an embodiment when applying the embodiment to LTE based system, the bandwidth of the frequency blocks the control channels are mapped to could be three PRBs each. Three PRBs equal to 504 KHz and thus combining two pieces a virtual 6 PRB frequency chunk is obtained from which a receiver can construct a signal of 1.08 MHz bandwidth. Thus it could be possible to reuse LTE common channels in their current format mapped in discontinuous way onto subcarriers in frequency domain.

Figure 2A:
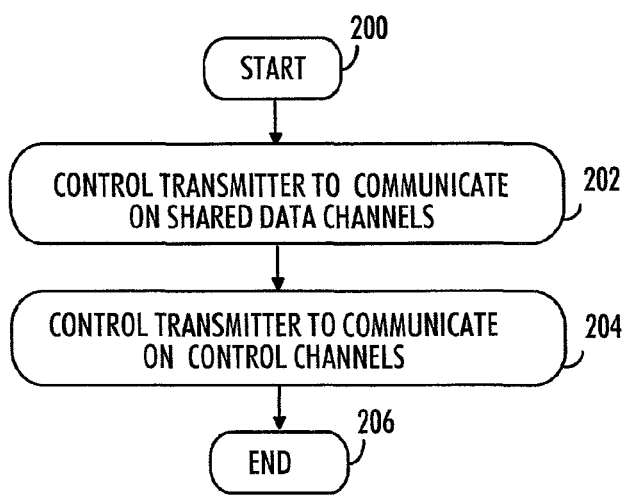
FIGS. 2A and 2B are flowcharts illustrating embodiments of the invention.

FIG. 2A is a flowchart illustrating an embodiment of the invention. In an embodiment, the example relates to the operation of user equipment or a base station or an eNodeB. The embodiment starts at step 200.

In step 202, a transceiver is controlled to communicate on shared data channels using a data channel slot comprising a sensing period and a data period. A transceiver may be configured to listen or measures the usage of a channel during a given sensing period before making the decision whether to transmit on the channel or not during the data period of the data channel slot. If the channel or spectrum is used by another device the transmitter is configured to abstain from transmitting or select a different channel. This way the transmission does not interfere with other transmissions on the same channel. The above procedure may be called a Listen-Before-Talk (LBT) procedure.

In step 204, the transceiver is controlled to communicate on common and dedicated control channels on a shared spectrum using control channel slots, each control channel slot being associated with a downlink data channel slot and comprising a downlink part and an uplink part, wherein the uplink part occurs at the same time as the sensing period. In an embodiment, each control channel slot is associated with a data channel slot. The uplink part of the control channel slot can provide fixed feedback delay for downlink transmission (similar to LTE FDD) even in very downlink oriented downlink/uplink ratio in data transmission opportunities.

The process ends in step 206.

Figure 2B:
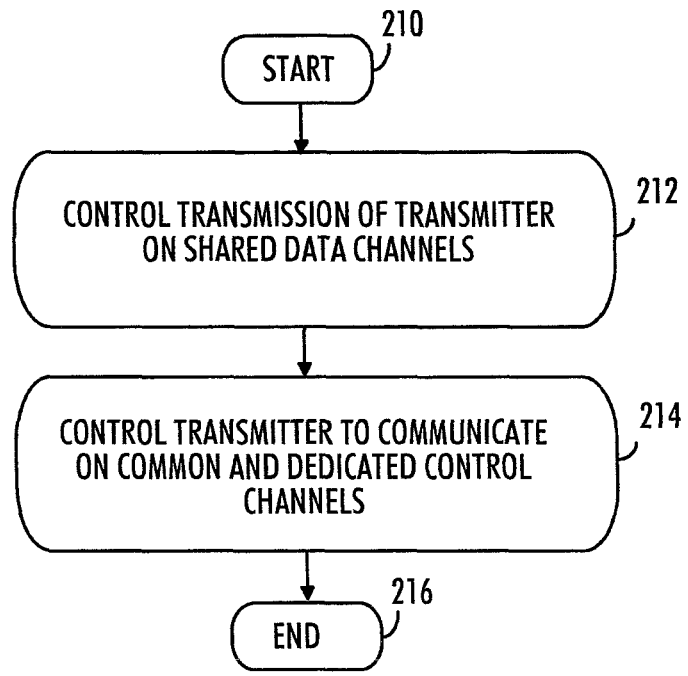

FIG. 2B is a flowchart illustrating an embodiment of the invention. In an embodiment, the example relates to the operation of a base station or an eNodeB. The embodiment starts at step 210.

In step 212, a transceiver is controlled to communicate on shared data channels using a downlink data channel slot by sensing traffic of the data channel during a sensing period of the data channel slot and making a decision whether to transmit or not during a data period of the data channel slot on the basis of the sensing.

In step 214, the transceiver is controlled to communicate on common and dedicated control channels on a shared spectrum using control channel slots, each control channel slot being associated with a downlink data channel slot and comprising a downlink part and an uplink part, wherein the uplink part occurs at the same time as the sensing period.

The process ends in step 216.

Figure 3:
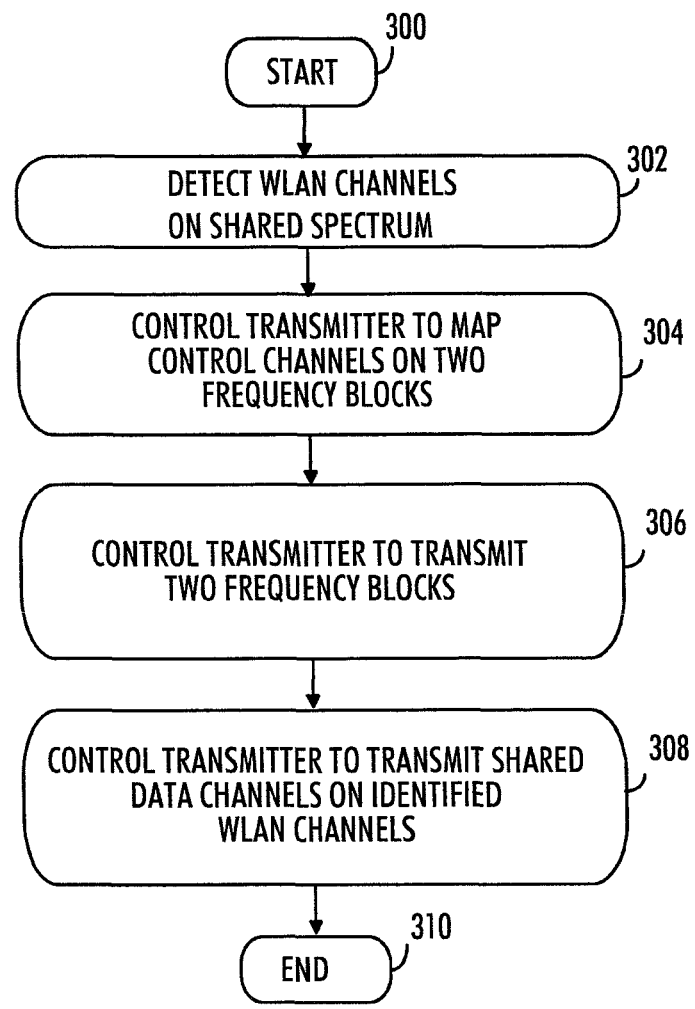
FIG. 3 illustrates a flowchart illustrating an example of a communication environment.

FIG. 3 is a flowchart illustrating an example of a communication environment. The embodiment starts at step 300.

In step 302, a transceiver is controlled to detect and identify WLAN channels on given shared spectrum. The shared spectrum may be the ISM band on 2.4 or 5 GHz, for example. In an embodiment, downlink and uplink control channels are transmitted in frequency hopping way (continuously in time domain) between the identified WLAN channels. Shared data channels for both downlink and uplink could be transmitted using Listen-Before-Talk (LBT) on identified WLAN channels. In LTE based systems, the shared data channels are Physical Downlink Shared Channel PDSCH and Physical Uplink Shared Channel PUSCH.

In step 304, a transceiver is controlled to map common and dedicated control channels on two frequency blocks on a shared spectrum utilizing the frequency bands between the identified WLAN channels.

In step 306, the transceiver is controlled to transmit the frequency blocks utilising pair-wise frequency hopping utilizing the frequency bands between the identified WLAN channels. Thus, the frequencies used in the transmission frequency blocks are hopping using the same hopping pattern. The hopping pattern may be a predefined pattern or one of a set of predefined hopping patterns. In general, the hopping patterns are defined by a base station or eNodeB or another network element of a communication system. When a UE is switched on it searches for control channels transmission of an eNodeB. When the UE finds a control channel transmitted by an eNodeB it may obtain information of the hopping pattern from the eNodeB.

For example in 2.4 GHz ISM band, there are three non-overlapping WLAN channels each using a bandwidth of 20/22 MHz. Taking into account a normal effective bandwidth of 83.5 MHz in 2.4 GHz ISM (in some countries, the 2.4 GHz ISM can utilize 100 MHz, and thus there are also 14 WLAN channels), it is possible to find resource at least for 15 non-overlapping frequency resources for the hopping control channel design. In addition, using the pair-wise hopping for the control channels and having hopping frequency of 1 ms (1 sub frame with two slots) allows a slot based hopping for PUCCH similar to current LTE based systems.

As mentioned above, in contrast to current LTE systems synchronization signals are not transmitted among the symbols of PDSCH, but in the control channel region utilizing the pair-wise hopping. In an embodiment, the hopping pattern and deployment of synchronization signals is designed so that the receiver (such as a UE) requiring the synchronization signals would not need to use the whole bandwidth of the ISM band to detect the synchronization signals in initial search phase of the LTE eNB on a ISM band. One option is to keep synchronization signals always in one region of the ISM band. The region may be the largest frequency region not used by the WLAN of the ISM band. For example, if the synchronization signals are transmitted every 5 ms, the hopping patterns may be so that control channel transmission takes place at least every 5 ms on certain resource region (the largest frequency region not used by the WLAN). E.g. when channels 1, 6 and 11 are used by a WLAN system, such largest frequency region would be from 2470 to 2480 MHz.

In step 308, the transceiver is controlled to transmit shared data channels using Listen-Before-Talk on identified WLAN channels. As described above, in Listen-Before-Talk a transceiver listens or measures the usage of a channel before making the decision whether to transmit on the channel or not. If the channel or spectrum is used by another device the transmitter is configured to abstain from transmitting or select a different channel. This way the transmission does not interfere with WLAN transmissions on the same channel.

The process ends in 310.

Figure 4A:
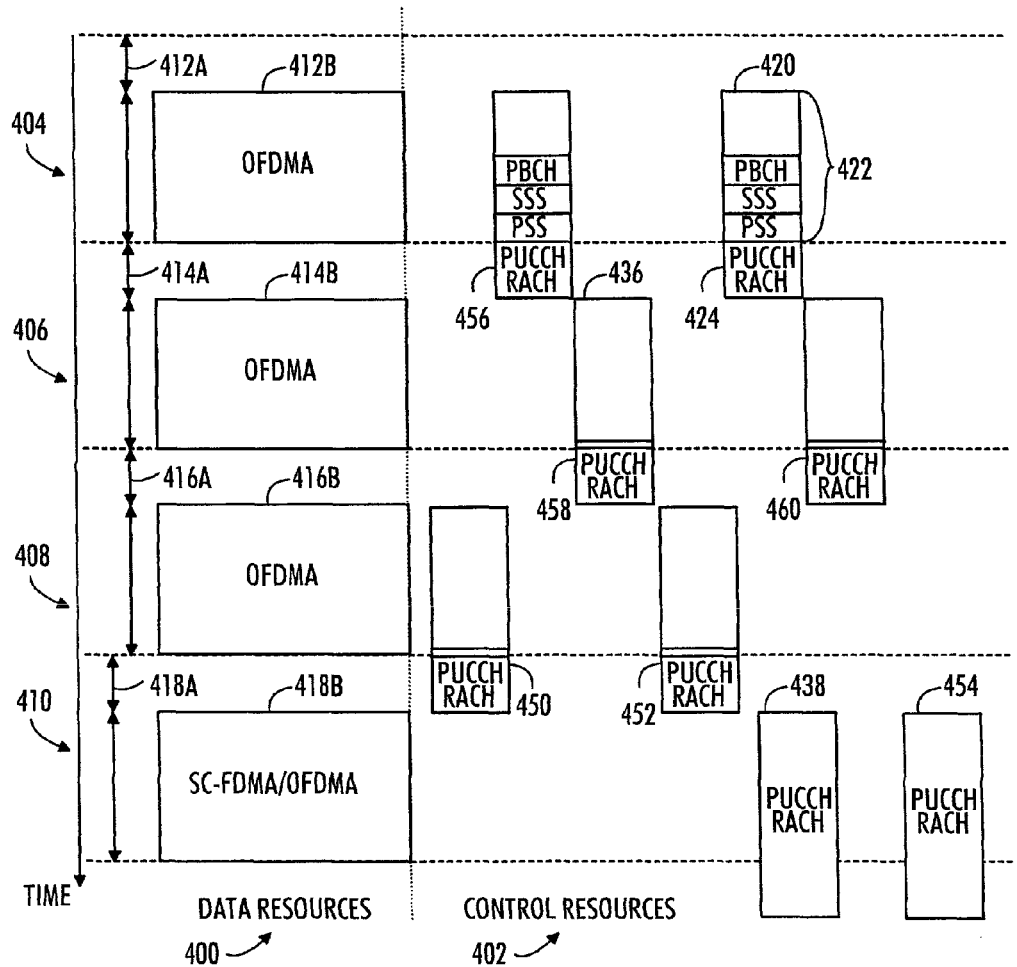
FIGS. 4A and 4B illustrate examples of the shared spectrum.

FIG. 4A illustrates an example of the shared spectrum. In the figure time runs from top to bottom. The spectrum comprises frequency resources 400 for data channels and frequency resources 402 for control channels. The figure is not in scale and for illustrative purposes only. In an embodiment, common and dedicated control channels are mapped to two frequency blocks and the transmission of the frequency blocks utilize pair-wise frequency hopping on a shared spectrum. More than one non-overlapping frequency resources may be utilised in when transmitting the two frequency blocks. For simplicity, FIG. 4A illustrates the spectrum as one continuous block. Thus, the hopping pattern shown in FIG. 4A is for illustrative purposes only.

FIG. 4A shows four successive transmission time intervals TTI 404, 406, 408, 410. The transmission time intervals may be slots, frames or sub frames, for example. In an embodiment, each TTI comprises a data channel slot and control transmission as control channel slot associated with the data channel block. The control channel slot comprises to two frequency blocks. In LTE based systems the blocks may be three PRBs wide each.

In this example, the TTIs 404, 406 and 408 comprise downlink data channel slots and TTI 410 an uplink data channel slot. Thus, in the data channel slot of TTIs 404, 406 and 408 a base station or eNodeB may transmit to one or more UEs and in the data channel slot of TTI 410 one or more UEs may transmit to base station(s).

Each data channel slot comprises a sensing period 412A, 414A, 416A, 418A and a data period 412B, 414B, 416B, 418B. During the sensing period a transmitter which intends to transmit on the following data period is configured to sense traffic of the data channel and make a decision whether to transmit or not during a data period of the data channel slot on the basis of the sensing.

In case of the uplink TTI 410, the available frequency resource may be divided between more than one UE. Each UE may sense only the frequency resource given to the UE.

In an embodiment, control channel slots 420 comprise a downlink part 422 and an uplink part 424. Thus, in each given control channel slot 420 the base station or eNodeB may be configured to transmit on the downlink part 422 and UEs in the uplink part 424.

In an embodiment, the uplink part 424 of a control channel slot 420 is in the end of the control channel slot and the transmission of the control channel slot 420 starts at the same time as the data period 412B of the associated downlink data channel slot. Therefore, the uplink part 424 of the control channel slot 420 occurs at the same time as the sensing period 414A of the next data channel slot. Thus the timing of control channel slot is delayed by the length of uplink part compared to the slot timing of the downlink data channel slot.

Figure 4B:
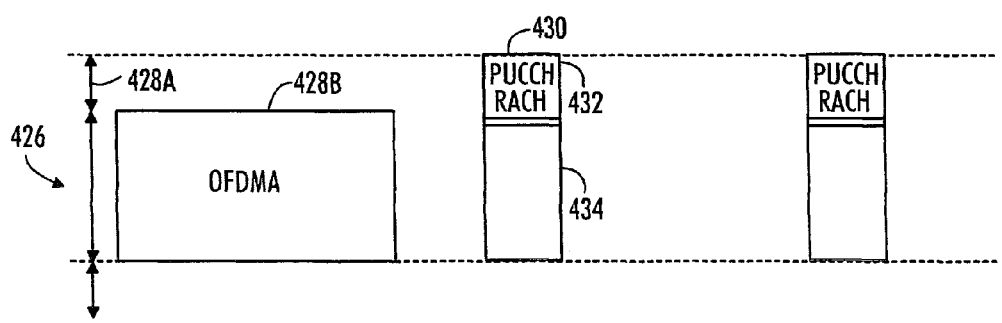

In an embodiment, the uplink part of a control channel slot is in the beginning of the control channel slot. FIG. 4B illustrates this embodiment. FIG. 4B shows a transmission time interval TTI 426 comprising a data channel slot with a sensing period 428A and a data period 428B. The control channel slot 430 comprises an uplink part 432 and a downlink part 434 where the uplink part occurs at the time as the sensing period 428A.

Figure 5A:
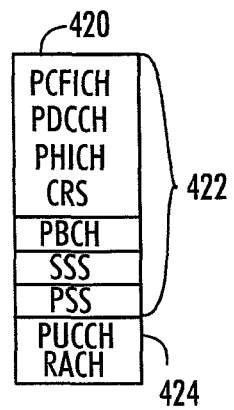
FIGS. 5A, 5B and 5C illustrate examples of different control channel slot configurations.
Figure 5B:
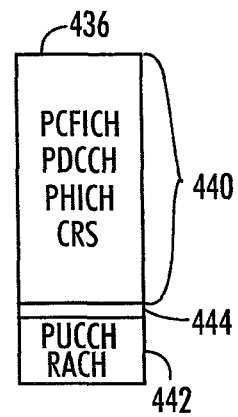
Figure 5C:
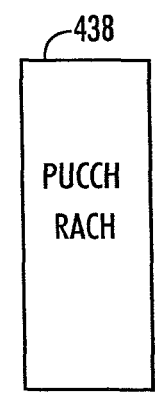

As FIG. 4A illustrates, there may be different control channels configurations, 420, 436, 438. FIGS. 5A, 5B and 5C illustrate examples of different configurations. In FIG. 5A, the configuration comprises in the downlink part Physical Control Format Indicator Channel PCFICH, Physical Downlink Control Channel PDCCH, Physical HARQ Indicator Channel PHICH, Physical Broadcast Channel PBCH, Primary Synchronization Signal PSS and Secondary Synchronization Signal SSS. The uplink part comprises shortened Physical Uplink Control Channel PUCCH and shortened Random Access Channel RACH. The downlink control channels are used by a base station for downlink scheduling commands, HARQ acknowledgements and uplink data transmission opportunity scheduling commands, for example.

Base station or eNodeB is configured to schedule uplink data transmission opportunities of the UEs regarding the uplink data channel slot of TTI 410 in the control channel slots 420. The UEs assigned the transmission opportunity need to sense the medium in the sensing period 418A and make a decision whether to transmit or not on the data period 418B of the scheduled resources. Furthermore, these UEs need to omit the uplink control channel transmission 450, 452 of the previous TTI 408 due to sensing requirement at the same time. The UEs that needed to omit their feedback transmission linked to certain previous downlink transmission shall then multiplex feedback for two downlink timeslots (depends on previous downlink transmissions to that specific UE) into PUCCH of the timeslot of uplink transmission opportunity or into scheduled PUSCH resources if UE decides to use those resources after sensing operation.

The transmission period of PSS, SSS and PBCH may be much higher than PCFICH, PDCCH and PHICH in practice as illustrated in FIG. 4A. The synchronization signals are used by UEs searching for base stations to synchronize with a base station. After synchronization, UEs may obtain information regarding the base station from PBCH which is transmitted in the same downlink sub frame just before PSS and SSS transmissions to allow fast broadcast information detection after initial synchronization. The UEs are configured to buffer the control channel data so the PBCH data may be obtained from the buffer after obtaining synchronization.

The UEs which are already connected to a base station need not listen to PSS or SSS. Thus, a guard period is not needed between downlink and uplink parts.

FIG. 5B illustrates an example 436 where downlink part 440 does not comprise synchronization signals and broadcast channel. In this example, a guard period 444 is required between the downlink part 440 and the uplink part 442.

FIG. 5C illustrates an example 438 of control transmission occurring at the same time as the uplink data channel slot. The control transmission comprises Physical Uplink Control Channel PUCCH and Random Access Channel RACH which may be longer that in the other configurations.

Figure 6B:
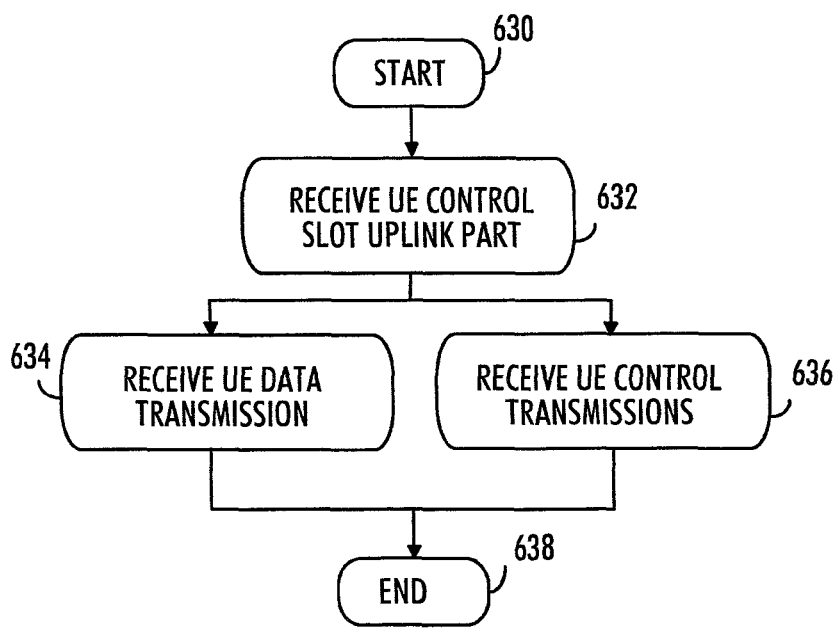
FIGS. 6A, 6B and 7 are flowcharts illustrating embodiments.
Figure 6A:
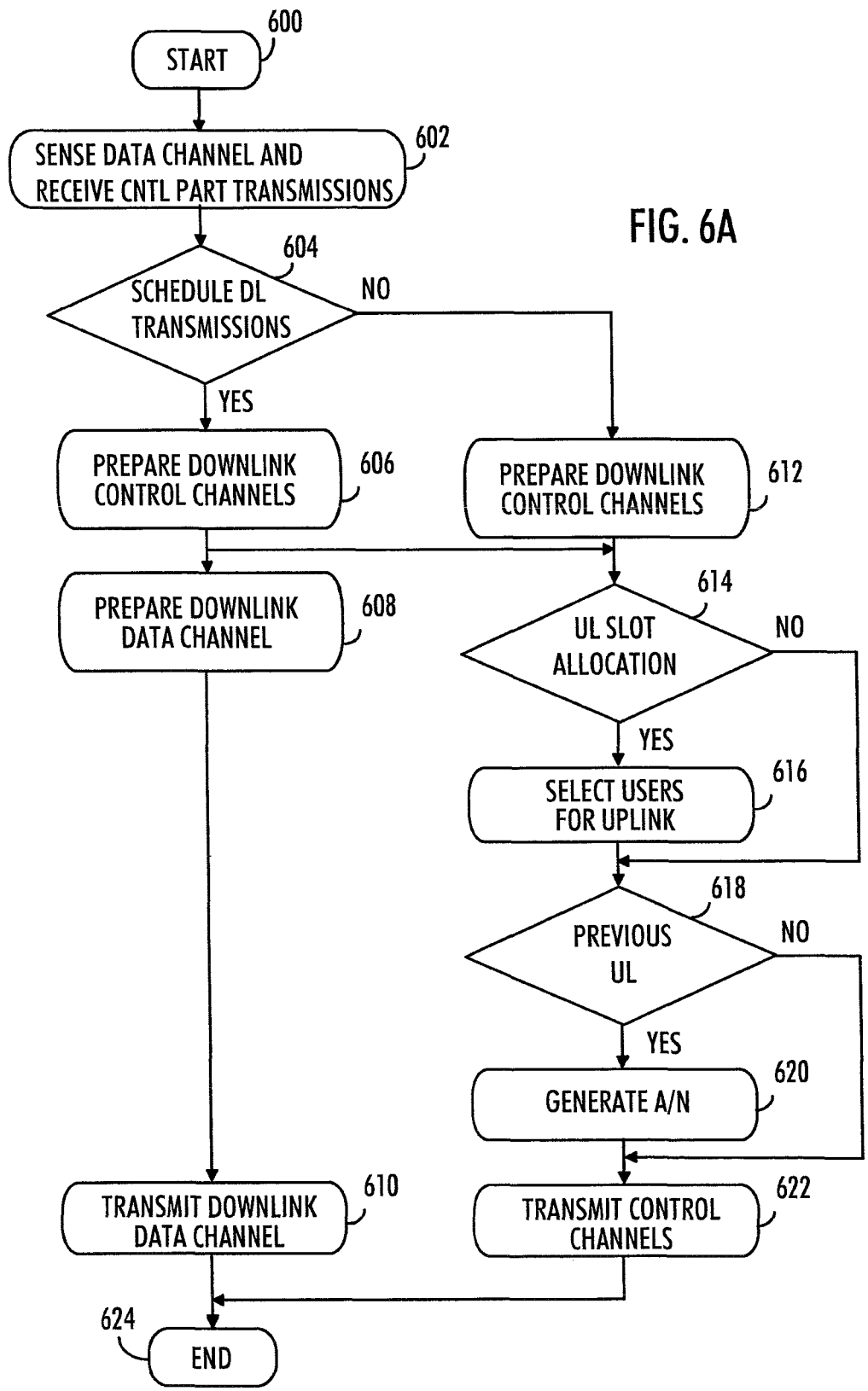

FIGS. 6A and 6B are flowcharts illustrating embodiments of the invention especially from the base station or eNodeB point of view. FIG. 6A illustrates an example of the operation of a base station eNodeB in case of a TTI comprising a downlink transmission opportunity, i.e. TTIs 404, 406 or 408 of FIG. 4A.

The process starts at step 600.

In step 602, the eNodeB performs data sensing during sensing period 412 and at the same time receives control channel transmission from UEs on the uplink part of the control channel slot associated with the previous TTI.

In step 604, the eNodeB decides on scheduling downlink data transmission on the basis of the sensing. If downlink data is to be transmitted, the eNodeB is configured to prepare downlink control channels in step 606 by indicating by given Radio Network Temporary Identifier RNTI on PDCCH common field that downlink opportunity is used in this time slot, select users to be scheduled and generate corresponding PDCCH. The process continues in steps 608 and 614.

In step 608, the eNodeB is configured to prepare downlink data channels for the selected users.

In step 610, the downlink data is transmitted in the data period 412B.

If the eNodeB determines in step 604 that downlink data is not to be transmitted, the process continues in step 612 by preparing downlink control channels by indicating in PCFICH that downlink opportunity is not used.

In step 614, the eNodeB determines if there is an uplink transmission slot becoming after a given delay $t_{ulDelay}$. As uplink data transmissions are scheduled by the eNodeB the scheduling command must be transmitted to the UEs a given time before the uplink transmission opportunity. Ion LYTE based systems the given time is denoted as $t_{ulDelay}$.

If there is an uplink transmission slot becoming, the eNodeB selects UEs to be scheduled and adds an uplink information part to PDCCH in step 616.

If there is no uplink transmission becoming the process continues in step 618 determines if there were uplink transmissions from UEs in a time slot which was a given delay $t_{ackNackDelay}$ before the present time slot.

If so, the eNodeB generates HARQ ACK/NACK on PHICH for these users in step 620.

If not the eNodeB transmits control channels in step 622 on the downlink part of control channel slot.

The process ends in step 624.

FIG. 6B illustrates an example of the operation of a base station eNodeB in case of a TTI comprising an uplink transmission opportunity, i.e. TTI 410 of FIG. 4A.

The process starts at step 630.

In step 632, the eNodeB is configured to receive transmissions 450, 452 from UEs on uplink part of control channel associated with the previous data slot during the sensing period 418A. The process continues simultaneously in steps 634 and 636.

In step 634, the eNodeB receives data transmissions from UEs on data part 4186 of the TTI 410.

In step 636, the eNodeB receives transmissions 438, 454 from UEs on control part of the resources.

The process ends in step 638.

Figure 7:
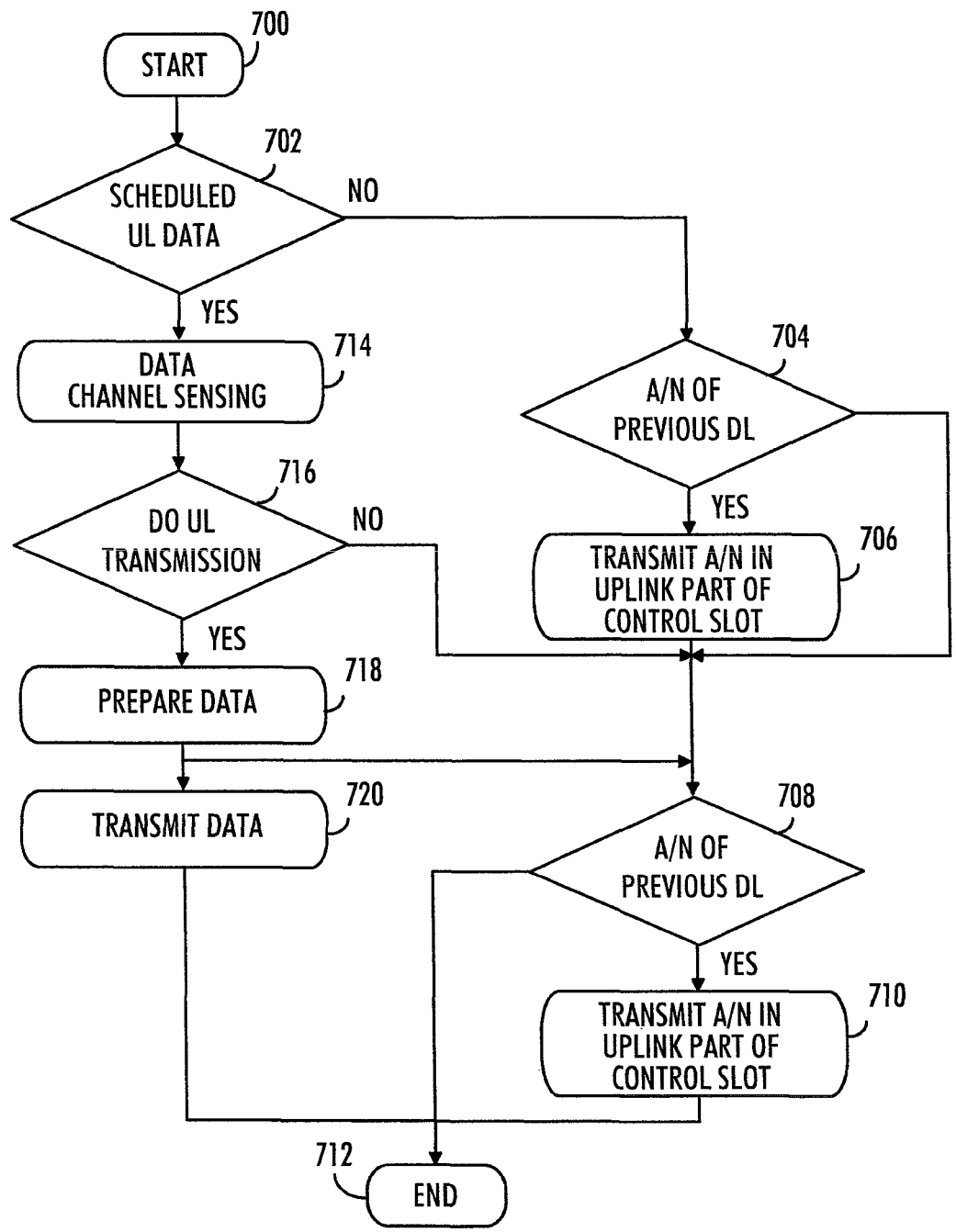

FIG. 7 is a flowchart illustrating an embodiment of the invention especially from the UE point of view.

The process starts at step 700.

In step 702, UE determines is the current TTI is an uplink or downlink transmission TTI for example 406 or 410 in FIG. 4A. If it is an uplink transmission TTI the process continues in step 714.

If it an uplink transmission TTI the process continues in step 704. In step 704 (i.e. TTI 406), the UE determines whether there is a need to transmit HARQ ACK/NACK of a previous downlink transmission during the uplink part of a control slot of previous TTI during the sensing period of the present TTI.

If so, PUCCH is transmitted on uplink part of control slots 424, 456 in step 706.

If not, the process continues in step 708 by determining if there is a need to transmit PUCCH (e.g. implicit mapping from early downlink transmission) during the uplink part of a control slot of the present TTI.

If so, PUCCH is transmitted on uplink part of control slot 458, 460 in step 710.

If it is a downlink transmission TTI was detected in step 702 the process continues in step 714 by sensing the resources allocated for the UE.

In step 716, the UE determines on the basis of sensing whether to transmit or not. If not, process continues in step 708.

In step 718, the UE prepares uplink transmission of data and control information.

In step 720, the UE transmits data on the data period.

The process ends in step 712.

Figure 8:
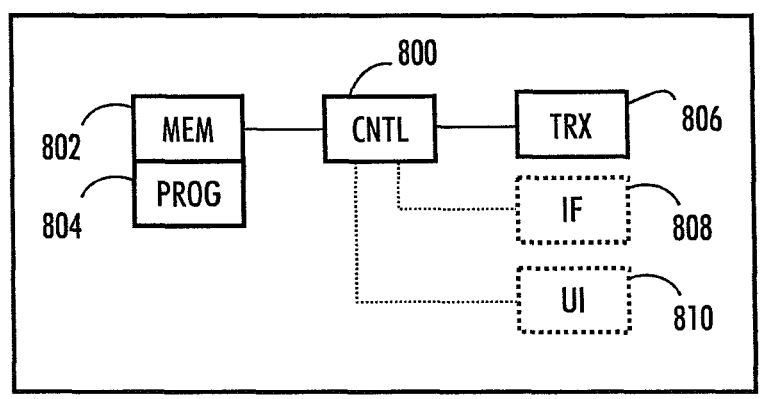
FIG. 8 illustrates an example of an apparatus.

FIG. 8 illustrates an embodiment. The figure illustrates a simplified example of an apparatus applying embodiments of the invention. In some embodiments, the apparatus may be an eNodeB or user equipment of a communications system. The apparatus may also be interpreted as a circuitry implementing the required functionality within an eNodeB or user equipment of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 800 configured to control at least part of the operation of the apparatus.

The apparatus may comprise a memory 802 for storing data. Furthermore the memory may store software 804 executable by the control circuitry 800. The memory may be integrated in the control circuitry.

The apparatus comprises a transceiver 806. The transceiver is operationally connected to the control circuitry 800. It may be connected to an antenna arrangement (not shown).

The software 804 may comprise a computer program comprising program code means adapted to cause the control circuitry 800 of the apparatus to control the transceiver 806.

The apparatus may further comprise interface circuitry 808 configured to connect the apparatus to other devices and network elements of communication system, for example to core. This applies especially if the apparatus is an eNodeB or a base station or respective network element. The interface may provide a wired or wireless connection to the communication network. The apparatus may be in connection with core network elements, eNodeB's, Home NodeB's and with other respective apparatuses of communication systems.

The apparatus may further comprise user interface 810 operationally connected to the control circuitry 800. The user interface may comprise a display, a keyboard or keypad, a microphone and a speaker, for example. This applies especially if the apparatus is user equipment or respective network element.

FIG. 8 illustrates an embodiment. The figure illustrates a simplified example of an apparatus applying embodiments of the invention. In some embodiments, the apparatus may be an eNodeB or user equipment of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 820 configured to control at least part of the operation of the apparatus.

The apparatus may comprise a memory 822 for storing data. Furthermore the memory may store software 824 executable by the control circuitry 820. The memory may be integrated in the control circuitry.

The apparatus comprises a transceiver 826. The transceiver is operationally connected to the control circuitry 820. It may be connected to an antenna arrangement (not shown).

The software 824 may comprise a computer program comprising program code means adapted to cause the control circuitry 820 of the apparatus to control the communication of a transceiver 826 on shared data channels using a data channel slot comprising a sensing period and a data period and control a transceiver to communicate on common and dedicated control channels on a shared spectrum using control channel slots, each control channel slot comprising a downlink part and an uplink part, wherein the uplink part occurs at the same time as the sensing period of a data channel slot.

The apparatus may further comprise interface circuitry 828 configured to connect the apparatus to other devices and network elements of communication system, for example to core. This applies especially if the apparatus is an eNodeB or a base station or respective network element. The interface may provide a wired or wireless connection to the communication network. The apparatus may be in connection with core network elements, eNodeB's, Home NodeB's and with other respective apparatuses of communication systems.

The apparatus may further comprise user interface 830 operationally connected to the control circuitry 820. The user interface may comprise a display, a keyboard or keypad, a microphone and a speaker, for example. This applies especially if the apparatus is user equipment or respective network element.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, the apparatus comprises means for controlling the communication of a transceiver on shared data channels using a data channel slot comprising a sensing period and a data period and means for controlling a transceiver to communicate on common and dedicated control channels on a shared spectrum using control channel slots, each control channel slot comprising a downlink part and an uplink part, wherein the uplink part occurs at the same time as the sensing period of a data channel slot.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus in a communication system, comprising:
   at least one processor; and
   at least one memory including computer program code,
   wherein the at least one memory and the computer program code configured to, with the at least one processor, cause the apparatus at least to perform:
   control a transceiver to communicate on shared data channels using data channel slots, each data channel slot comprising a sensing period and a data period; and
   control the transceiver to map common and dedicated control channels on two frequency blocks which utilize pair-wise frequency hopping on a shared spectrum, and to communicate on the mapped common and dedicated control channels on the shared spectrum using control channel slots, each control channel slot comprising a downlink part and an uplink part, wherein each uplink part occurs at the same time as the sensing period of one of the data channel slots.

2. The apparatus of claim 1, the apparatus being configured to:
   control a transmission of the transceiver on the shared data channels using a downlink data channel slot by sensing traffic of the data channel during a sensing period of the data channel slot and making a decision whether to transmit or not during a data period of the data channel slot on the basis of the sensing; and
   control the transceiver to communicate on the common and dedicated control channels on a shared spectrum using control channel slots, each control channel slot being associated with a downlink data channel slot and comprising a downlink part and an uplink part, wherein the uplink part occurs at the same time as the sensing period.

3. The apparatus of claim 2, the apparatus being configured to control the transceiver to transmit in predetermined control channel slots a broadcast control channel prior to synchronization symbols in the end of the downlink part of the control channel slot.

4. The apparatus of claim 3, wherein the control channel slots comprise a downlink part and an uplink part except the predetermined control channel slots comprise a transition period between the downlink part and the uplink part.

5. The apparatus of claim 2, wherein the downlink part of the control channel slots comprise downlink scheduling commands and uplink data transmission opportunity scheduling commands.

6. The apparatus of claim 1, wherein the uplink part of a control channel slot is in the beginning of the control channel slot.

7. The apparatus of claim 1, wherein the uplink part of a control channel slot is in the end of the control channel slot and the transmission of the control channel slot starts at the same time as the data period of the associated downlink data channel slot and the uplink part of the control channel slot occurs at the same time as the sensing period of the next data channel slot.

8. The apparatus of claim 1, the apparatus being configured to control the transceiver to utilize more than one non-overlapping frequency resources when transmitting the two frequency blocks utilizing pair-wise frequency hopping.

9. The apparatus of claim 1, the apparatus being configured to:
control the transceiver to receive downlink control channels during the downlink part of the control channel slot and transmit uplink control channels using the uplink part of the control channel slot;
control the transceiver to receive a scheduling command from a base station for uplink transmission opportunity using a given uplink data channel slot; and
control the communication of the transceiver on shared data channels using the given uplink data channel slot by sensing traffic of the data channel during a sensing period of the data channel slot and making a decision whether to transmit or not during a data period of the data channel slot on the basis of the sensing.

10. The apparatus of claim 9, the apparatus being configured to refrain from transmitting on the uplink part of control channel slots occurring at the same time as uplink data channel slots.

11. The apparatus of claim 10, the apparatus being configured to transmit control channel slots comprising only an uplink part when transmitting an uplink data channel slot.

12. A method in a communication system, comprising:
controlling a transceiver to communicate on shared data channels using data channel slots, each data channel slot comprising a sensing period and a data period; and
controlling the transceiver to map common and dedicated control channels on two frequency blocks which utilize pair-wise frequency hopping on a shared spectrum, and to communicate on the mapped common and dedicated control channels on the shared spectrum using control channel slots, each control channel slot comprising a downlink part and an uplink part,
wherein each uplink part occurs at the same time as the sensing period of one of the data channel slots.

13. The method of claim 12, further comprising:
controlling a transmission of the transceiver on the shared data channels using a downlink data channel slot by sensing traffic of the data channel during a sensing period of the data channel slot and making a decision whether to transmit or not during a data period of the data channel slot on the basis of the sensing; and
controlling the transceiver to communicate on the common and dedicated control channels on shared spectrum using control channel slots, each control channel slot being associated with a downlink data channel slot and comprising a downlink part and an uplink part, wherein the uplink part occurs at the same time as the sensing period.

14. The method of claim 13, further comprising: controlling the transceiver to transmit in predetermined control channel slots a broadcast control channel prior to synchronization symbols in the end of the downlink part of the control channel slot.

15. The method of claim 13, wherein the control channel slots comprise a downlink part and an uplink part except the predetermined control channel slots comprise a transition period between the downlink part and the uplink part.

16. The method of claim 13, wherein the uplink part of a control channel slot is in the beginning of the control channel slot.

17. The method of claim 13, wherein the uplink part of a control channel slot is in the end of the control channel slot and the transmission of the control channel slot starts at the same time as the data period of the associated downlink data channel slot and the uplink part of the control channel slot occurs at the same time as the sensing period of the next data channel slot.

18. The method of claim 12, further comprising:
controlling the transceiver to receive downlink control channels during the downlink part of the control channel slot and transmit uplink control channels using the uplink part of the control channel slot;
controlling the transceiver to receive a scheduling command from a base station for uplink transmission opportunity using a given uplink data channel slot; and
controlling the communication of the transceiver on shared data channels using the given uplink data channel slot by sensing traffic of the data channel during a sensing period of the data channel slot and making a decision whether to transmit or not during a data period of the data channel slot on the basis of the sensing.

19. The method of claim 18, further comprising: refraining from transmitting on the uplink part of control channel slots occurring at the same time as uplink data channel slots.

20. The method of claim 19, further comprising: transmitting control channel slots comprising only an uplink part when transmitting an uplink data channel slot.

21. A computer readable memory storing program instructions which, when loaded into an apparatus, execute a computer process comprising:
controlling a transceiver to communicate on shared data channels using data channel slots, each data channel slot comprising a sensing period and a data period; and
controlling the transceiver to map common and dedicated control channels on two frequency blocks which utilize pair-wise frequency hopping on a shared spectrum, and to communicate on the mapped common and dedicated control channels on the shared spectrum using control channel slots, each control channel slot comprising a downlink part and an uplink part,
wherein each uplink part occurs at the same time as the sensing period of one of the data channel slots.

* * * * *